United States Patent
Sauvage

(10) Patent No.: US 7,150,023 B1
(45) Date of Patent: Dec. 12, 2006

(54) DYNAMIC RESOURCE CONTROL IN A PROCESSING SYSTEM

(75) Inventor: Pierre Sauvage, Notre Dame de Commiers (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 494 days.

(21) Appl. No.: 09/915,404

(22) Filed: Jul. 27, 2001

(30) Foreign Application Priority Data

Jul. 31, 2000  (EP) .................................. 00410088

(51) Int. Cl.
*G06F 3/00* (2006.01)
*G06F 9/46* (2006.01)

(52) U.S. Cl. ...................................... 719/311; 718/104

(58) Field of Classification Search ................ 719/311, 719/312; 718/104
See application file for complete search history.

(56) References Cited

U.S. PATENT DOCUMENTS 5,745,694 A    4/1998  Egawa et al. .......... 395/200.55
5,790,809 A *  8/1998  Holmes ....................... 709/228
5,940,504 A    8/1999  Griswold .......................... 380/4
6,023,766 A    2/2000  Yamamura .................. 713/201
6,457,063 B1 * 9/2002  Chintalapati et al. ....... 719/317
6,785,726 B1 * 8/2004  Freeman et al. ............ 709/227

* cited by examiner

*Primary Examiner*—Meng-al T. An
*Assistant Examiner*—Kenneth Tang
(74) *Attorney, Agent, or Firm*—Foley & Lardner LLP

(57) ABSTRACT

The invention suggests providing in a processing system a licence controller (1), for controlling use of a resource by processes (3, 5, 7); for each process to be controlled, there is provided an inter-process communication (9, 11) between the process and the licence controller. A process and the licence controller exchange through the inter-process communication of the process information regarding actual and allowed use of the resource by the process. According to this information, the process may be controlled, be it on a self-control basis or through control of the licence controller.

Use of the resource to be dynamically adapted; high availability is guaranteed since processes may operate even when the licence controller fails.

4 Claims, 2 Drawing Sheets

DYNAMIC RESOURCE CONTROL IN A PROCESSING SYSTEM

The invention relates to processing systems, and more specifically to resource control in a processing system. It notably applies to controlling licences in multiprocessing telecommunication systems or in computers.

Resource control is used in the field of computers for controlling software or hardware licences. Current licensing control schemes fall into three main categories:
  installation time;
  hardware protection;
  start-up time.

Other products—such as the products of Oracle—rely on the user and do not use any licensing control scheme.

Installation time protection is often used for PC software and requires input of a password when the software is installed; the password being provided at the time the product is purchased. Hardware protection schemes make it necessary to connect a hardware protection device to the computer system in order to use the resource. The behaviour of the protection device is scanned in order to allow or prohibit use of the resource. Start-up time protection is used for HP Open Call SS7; the application program relies on the licence granted at start-up time.

These schemes have the following drawbacks. They do not allow dynamic control of the licence, or more generally, dynamic control of the use of a resource. An application needs to be stopped in order to change its licence status.

U.S. Pat. No. 5,940,504 proposes a license management scheme for recording the use of a licensed product, and for controlling its use in accordance with the terms of the license. A licensed product invokes a license check monitor at regular time intervals. The monitor generates request datagrams which identify the licensee and the product and sends the request datagrams over a network to a license control system. The license control system maintains a record of the received datagrams, and compares the received datagrams to data stored in its licensee database. The license control system transmits reply datagrams with either a denial or an approval message to the monitor. The monitor terminates further use of the product if it receives a denial message. The monitor generates its own denial message if its request datagrams are unanswered after a predetermined interval of time.

In the field of multiprocessing systems, such as telecommunication multiprocessing systems, there is a particular need for a resource control scheme that allows real-time and continuous use of applications in variable load conditions. This need for a resource control scheme is also present in other types of processing systems that only feature a single processor.

The applicant provides under the trademark HP Open Call SS7 a platform for telecommunication Common Channel Signalling systems operating under CCITT Signalling System no. 7. The HP Open Call SS7 system is a multiprocessing system; it is part of a signalling network existing within the telecommunication network and controlling it. The operation of these platforms is generally satisfactory, but could still be improved as regards licensing technology. Current licensing technologies used within the applicant's HP Open Call SS7 are process-oriented; the licensing controls the process behaviour; the licensing scheme is static and does not allow dynamic upgrade. Last, all components implement the complete licensing processing: key computation, interface, documentation, licensing logic—such as actions in case of misused licence, logs, alarms, etc.

Windows 2000 allows control of CPU time by the various applications. At the time an application is started, the ratio of CPU time used by the application may be limited. This solution is not dynamic, and implies that an application needs to be shut down and restarted in order to limit CPU access.

This invention is directed to overcoming these problems by improving the control of the use of a resource in a data processing system in a manner that provides for dynamic control of the use of the resource and does not rely on the continual availability of a separate control system so as to enable high availability of the processes and the possibility of on-line upgrades.

To achieve this, the invention provides a method for controlling the use of a resource by at least one process in a data processing system having an inter-process communication mechanism provided with storage facilities that do not rely on the functioning of processes that use the mechanism, comprising the steps of: providing a licence controller;

communicating an allowed work unit rate for the resource between the at least one process and the licence controller by storing at least one parameter in the storage facilities provided by the inter-process communication; and, in the at least one process, controlling the use of the resource by the process according to the parameter.

In one embodiment of the invention, the step of communicating comprises having the licence controller repeatedly update the parameter according to the use of the resource allowed for the process. In this case, the step of communicating may comprise having a process repeatedly read from its inter-process communication the allowed work unit rate for the resource.

In another embodiment of the invention, the step of communicating comprises having the licence controller read from the inter-process communication of a process the actual use rate for the resource by the process.

In both embodiments, the step of controlling may comprise, for the process, adapting its operation to the allowed work unit rate for the process.

In yet another embodiment of the invention, the processes comprise a plurality of identical processes, and the step of communicating comprises having the licence controller update the inter-process communication of said identical processes while sharing use of the resource between said identical processes.

The invention notably can be applied to multiprocessing systems.

The invention further relates to a processing system, comprising a resource and at least one process using the resource; a licence controller; an inter-process communication between the licence controller and each process, wherein an inter-process communication contains information representative of the allowed use of the resource by its process.

Last, the invention provides a processing system, comprising a resource and at least one process using the resource; a licence controller; an inter-process communication between the licence controller and each process, wherein an inter-process communication contains information representative of the actual use of the resource by its process.

A system embodying the invention will now be described, by way of non-limiting example, and with reference to the accompanying drawings, wherein.

Whilst the invention is described below with reference to a preferred embodiment, where it is applied to licence control in a multiprocessing system, it will be understood that the invention may be applied more generally to control any type of distributed resource, e.g. for controlling memory size, rate of CPU time, access to disks, peripherals, printers, networks, etc. The invention applies not only to multiprocessing systems, but also more generally to any type of processing system, including single-processor systems such as conventional personal computers.

According to the invention, a licence controller is provided for each process to be controlled, for controlling the licensing of the process. An inter-process communication mechanism between the process and the licence controller is also provided. Through the inter-process communication, a process and the licence controller exchange information regarding actual and allowed use of the resource by the process. According to this information, the process may be controlled. The invention applies to a multiprocessing system, inasmuch as the licence controller is a process separate from other processes.

Figure 1:
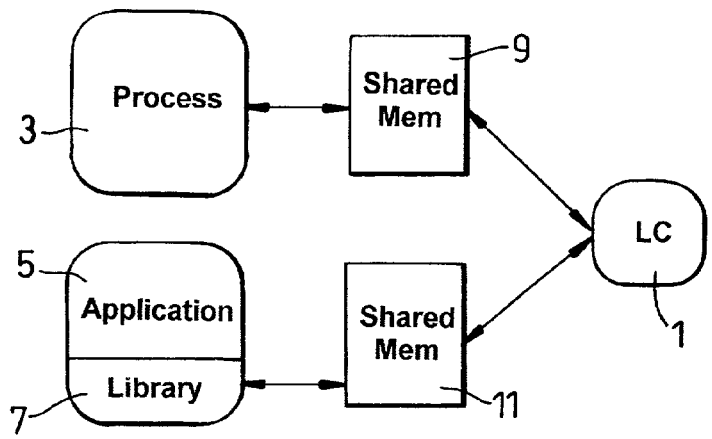
FIG. 1 is a schematic view of a multiprocessing system embodying the invention.

FIG. 1 is a schematic view of a multiprocessing system embodying the invention: it shows a licence controller 1, and two resource users, that is a process 3 and an application 5 with its attached library 7. There is provided a memory 9 that is shared between process 3 and licence controller 1. Shared memory 9 thus acts as an inter-process communication between process 3 and licence controller 1. There is provided another memory 11 shared between library 7 and licence controller 1. Shared memory 11 thus acts as an inter-process communication path between library 7 and licence controller 1. Shared memories 9 and 11 may be independent memories, or may be segments of the same physical memory. In any case, memories 9 and 11 are functionally independent.

The licence controller 1 is a process designed to allocate use of resources—in the present embodiment, it is designed to control the operation of process 3 and application 5, that is the amount of work unit rate for the process or for the application. Shared memories 9 and 11 act as inter-process communication paths that allows each process to communicate with the other process. It will be understood that other types of inter-process communication could be used, e.g. a socket or a file. A shared memory permits a heart beat scheme to be implemented, as exemplified below. Where as a socket simply returns to one of the processes a signal originating from the other process, a shared file may be accessed successively by the process and the licence controller. A time-lock that is reassessed each time a process accesses the file also allows the licence controller to control the activity of the process.

Process 3 and library 7 each define a work unit, which is an activity unit or a resource unit—such as memory or CPU requirement—, the operation of which needs to be controlled.

Figure 2:
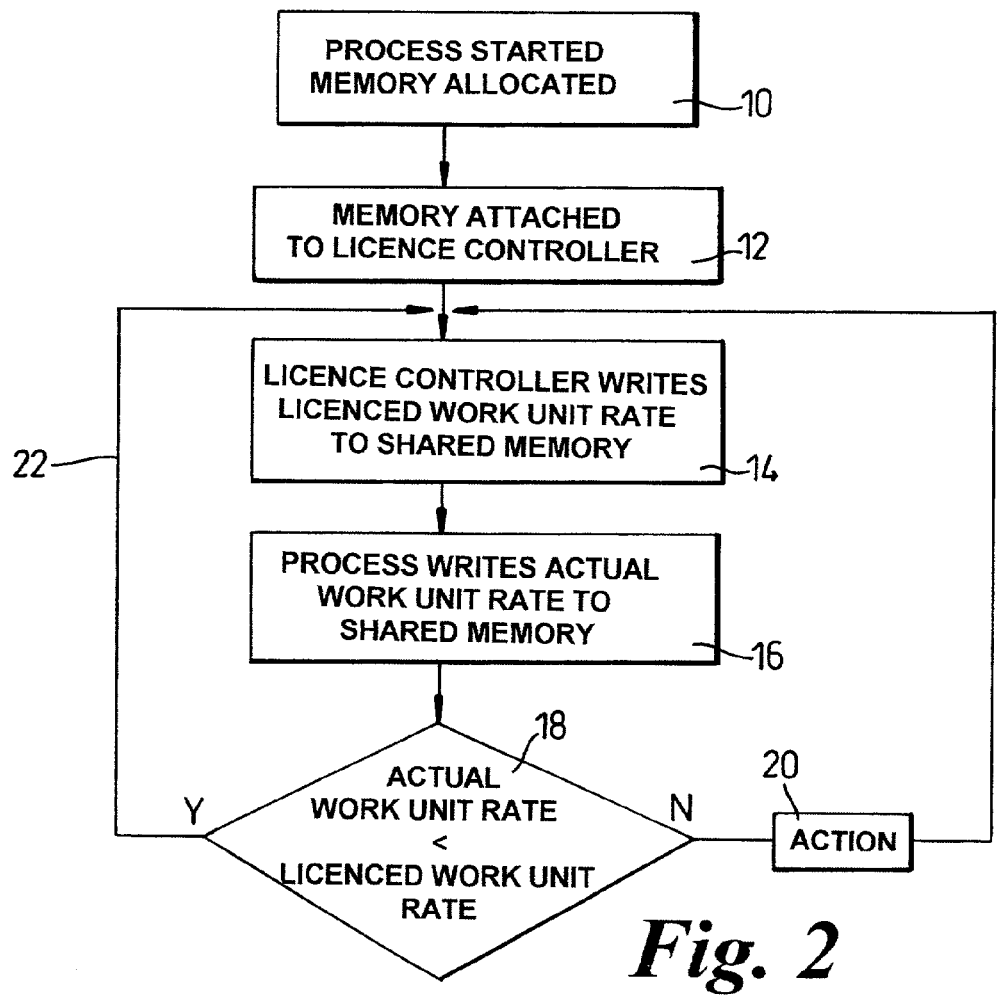
FIG. 2 is a flowchart of the operation of the system of FIG. 1.

The operation of the system of FIG. 1 is now described, with reference to FIG. 2, which is a flowchart of the operation of the system of FIG. 1, as regards process 3. It is assumed in this description that process 3 is started before application 5. In step 10, process 3 is started, and memory 9 is allocated for the inter-process communication. Process 3 then writes in the inter-process communication information regarding its identity and its work unit rate. This information may comprise, for instance:

licensing revision;
process name;
protocol entity;
work unit type;
actual work unit rate.

At step 12, memory 9 is attached to the licence controller enabling the licence controller to communicate with the process. The process is identified by the information contained in the inter-process communication at the time it is attached to the licence controller.

At step 14, licence controller 1 computes an allowed use for process 3; where the invention is applied to licence control, the computed information is representative of the operation of process 3 allowed under the licence; in the case of a telecommunication signalling network, the computed information may represent a transaction rate, a call rate, or a link number: more generally, the computed information is representative of the activity unit or resource unit rate. Licence controller 1 writes the computed information into shared memory 9.

At step 16, process 3 writes actual work unit rate into shared memory 9. At this time, shared memory contains both the licensed work unit rate and the actual work unit rate for the process. The actual work unit rate may thus be compared to the licensed work unit rate, as indicated in box 18. If the actual work unit rate is higher than the licensed work unit rate, as indicated at 20, action may be taken by the process, or by the licence controller, since the information is available to both. Else, as symbolised by arrow 22, licence controller 1 or process 3 may update the licensed or actual work unit rate at any time.

Thus, once process 3 is started, it may at any time read licence information from shared memory 9, and adapt its operation to the licence information read. Similarly, licence controller 1 may at any time write into shared memory 9 update licence information for controlling the operation of process 3, or take whatever necessary action according to the actual work unit rate read from the shared memory.

The operation of the system of FIG. 1 as regards library 7 is similar. Licence controller 1 may thus control operation of library 7 and application 5.

The operation of the system, as exemplified above, provides the following advantages: the operation is process oriented, and licence controller 1 may control operation of each process independently; in addition, operation of an application may be controlled through its library. In addition, as discussed in reference to FIG. 2, licensing is dynamic, and may be updated at any time during the operation of a process. It can be seen that high availability for the processes is ensured, processes may be restarted even if the licence controller is not available, or may continue their operation even when and if the licence controller is not active. This allows the licence controller to be updated or modified without impacting the operation of controlled processes.

In addition, the information stored in the inter-process communication may comprise a work unit tolerance, indicating, for instance, if the licensed rate may be exceeded for a given period of time. This feature is particularly useful for telecommunication systems, where a traffic peak may have to be dealt with for a short period of time. Last, the information stored in the inter-process communication may comprise action to be taken in case of excess of licensed work unit rate or action to be taken in case of excess of work unit tolerance. This allows action to be taken either by the process or by the licence controller.

The invention thus allows the licensing processing to be implemented in the licence controller, and not necessarily in each and every process. This makes it possible to simplify the operation of a process, by only requiring ability to address the inter-process communication. Key computation, interface documentation, licensing logic—actions in case of misused licence, logs and alarm—may be implemented in the licence controller only, for all controlled processes.

Figure 3:
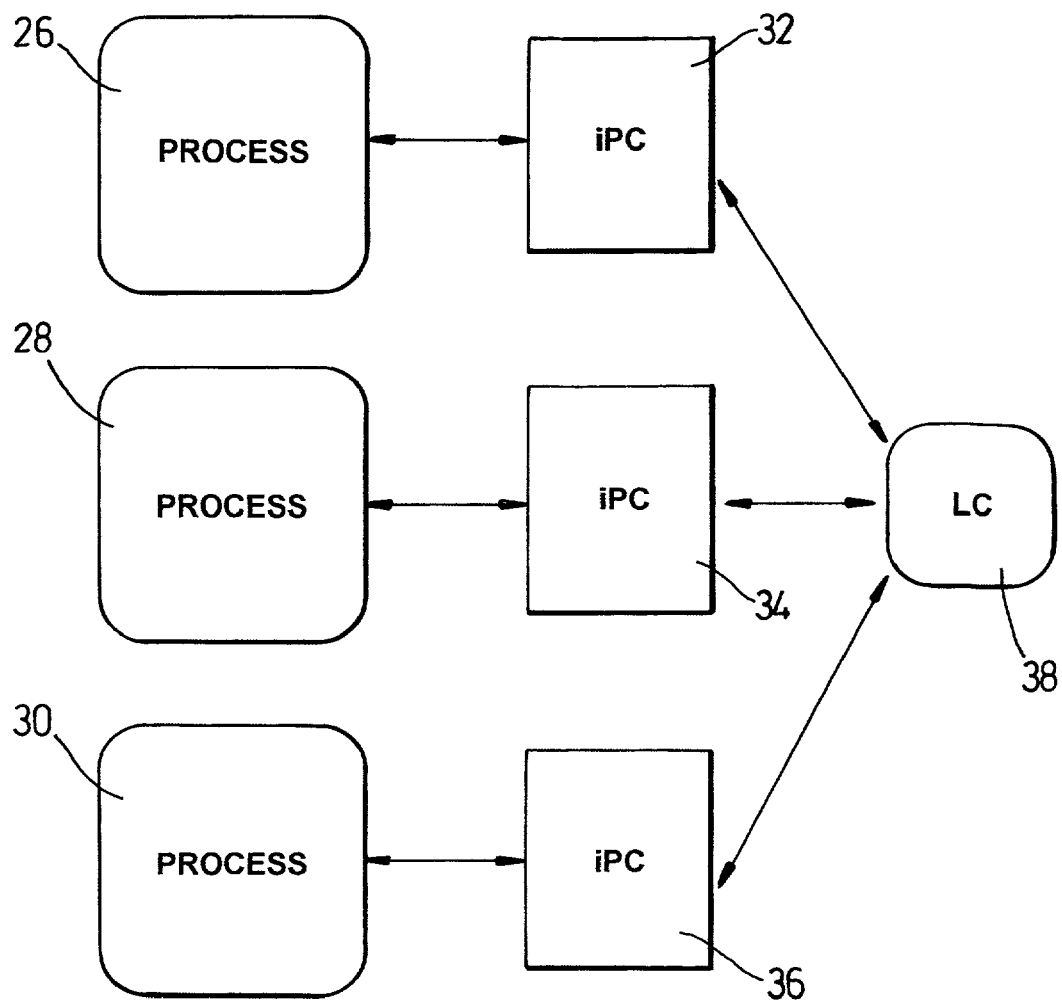
FIG. 3 is a schematic view of another multiprocessing system embodying the invention.

FIG. 3 is a schematic view of another multiprocessing system embodying the invention. The system comprise three processes 26, 28 and 30, and the invention is used for sharing load between the processes. Inter-process communications 32, 34, 36 are provided between each process and a licence controller 38. At start-up time, assuming there as m processes, and the overall licence for this type of processes is n, the right for each process is n/m. If a process fails, this may be noticed by the licence controller—either because the actual work unit rate decreases, or because there is no update of the actual work unit rate. The licence controller may then increase the licensed working rate for the other processes to n/(m−1).

Whenever a process needs to be stopped, the licence controller may progressively and gracefully decrease the licensed work unit rate. On the contrary, a licensed work unit rate may be increased progressively: for instance, when a new process is installed, it may be started for test purposes with a reduced licensed working rate. The licensed working rate may thereafter be increased, at the end of the testing phase.

The invention thus provides dynamic update, load sharing, and a graceful stopping of processes.

The invention is of particular advantage when applied in telecommunication multiprocessing systems, such as the HP Open Call SS7 platform of the applicant. Complete and accurate control of licences, or of the use of resources, can be achieved without any detrimental effect on the operation of the system.

Although the invention has been explained in reference to preferred embodiments, it should be understood that it is not limited to these embodiments, and that various changes or modifications can be contemplated by the person skilled in the art, without departing from the invention, as determined by the appended claims. For instance, in the preferred embodiment, the actual work unit rate and the licensed work unit rate were both written in the inter-process communication. However, the invention could also apply where only the licensed work unit rate is written to the inter-process communication, in case where any action to be taken is taken by the process.

In the description above, the "process" may cover any resource user. Specifically, the "process" could be an actual process, in the usual meaning of this term, a library, a hardware device, etc.

As discussed above, the invention was described in reference to the preferred embodiment of a multiprocessing system; it may also be applied to a system having a single processor, for controlling use of resources. It may thus apply for controlling CPU use in a multitask system, for controlling licenses, or for controlling use of peripherals or other hardware or software resources.

The invention claimed is:

1. A method for controlling the use of a resource by at least one process in a data processing system having an inter-process communication mechanism provided with storage facilities that do not rely on the functioning of processes that use the inter-process communication mechanism, comprising the steps of:
   providing a licence controller;
   communicating, at an allowed work unit rate for the resource, between the at least one process and the licence controller by storing at least one parameter in the storage facilities provided by the inter-process communication; and, in the at least one process,
   controlling the use of the resource by the process according to the parameter,
   wherein the processes comprise a plurality of identical processes, and wherein the step of communicating comprises having the licence controller update the inter-process communication of said identical processes while sharing use of the resource between said identical processes, and
   said method further comprising:
     monitoring a use amount of the resource by each of said identical processes to determine if any of said identical processes are using the resource at a rate below a predetermined amount; and
     if the monitoring is such that at least one of said identical processes is using the resource at a rate below the predetermined amount, updating the inter-process communication such that the at least one of said identical processes are provided with no allocation of the resource and the resource is divided among the other ones of said identical processes that are using the resource at a rate at or above the predetermined amount.

2. A method as claimed in claim 1 wherein the processing system is a multiprocessing system.

3. A processing system comprising:
   a resource and at least one process using the resource;
   a license controller;
   an inter-process communication between the license controller and each process provided with storage facilities that do not rely on the functioning of processes that use the inter-process communication,
   wherein an inter-process communication contains information representative of the allowed use of the resources by its process,
   wherein the license controller comprises program elements for communicating an allowed work unit rate for the resource between the at least one process and the licence controller by storing at least one parameters in the storage facilities provided by the inter-process communication; and the process comprises program elements for controlling the use of the resource by the process according to the parameter,
   wherein the licence controller is arranged to update the inter-process communication of a process according to the use of the resource allowed for the process,
   wherein the licence controller is arranged to update the inter-process communication of a plurality of identical processes to enable sharing use of the resource between said identical processes, and
   wherein a use amount of the resource by each of said identical processes is monitored by said licence controller to determine if any of said identical processes are using the resource at a rate below a predetermined amount; and
   if said licence controller determines that at least one of said identical processes is using the resource at a rate below the predetermined amount, updating the inter-process communication such that the at least one of said identical processes are provided with no allocation of the resource and the resource is divided among the other ones of said identical processes that are using the resource at a rate at or above the predetermined amount.

4. A processing system as claimed in claim 3 wherein the processing system is a multiprocessing system.

* * * * *